US009584311B2

(12) United States Patent
Meyer et al.

(10) Patent No.: US 9,584,311 B2
(45) Date of Patent: Feb. 28, 2017

(54) DECRYPTING DATA

(71) Applicants: Bernd Meyer, München (DE); Marcus Schafheutle, München (DE)

(72) Inventors: Bernd Meyer, München (DE); Marcus Schafheutle, München (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 14/363,253

(22) PCT Filed: Nov. 14, 2012

(86) PCT No.: PCT/EP2012/072598
§ 371 (c)(1),
(2) Date: Jun. 5, 2014

(87) PCT Pub. No.: WO2013/083375
PCT Pub. Date: Jun. 13, 2013

(65) Prior Publication Data
US 2014/0348326 A1    Nov. 27, 2014

(30) Foreign Application Priority Data
Dec. 6, 2011    (DE) .................. 10 2011 087 804

(51) Int. Cl.
*H04K 1/00*    (2006.01)
*H04L 9/00*    (2006.01)
(52) U.S. Cl.
CPC .......... *H04L 9/008* (2013.01); *H04L 2209/16* (2013.01)

(58) Field of Classification Search
CPC . H04L 9/008; H04L 2209/16; G06F 12/1408; G06Q 20/1235; G06Q 20/341;
(Continued)

(56) References Cited

U.S. PATENT DOCUMENTS

2010/0091984 A1* 4/2010 Kerschbaum et al. ......... 380/30
2011/0110525 A1    5/2011 Gentry
(Continued)

FOREIGN PATENT DOCUMENTS

CN    102238006 A    11/2011
DE    10120288 A1   11/2002

OTHER PUBLICATIONS

Automata, Languages and Programming, International Colloquium ICALP 2000, Lecture Notes in Computer Science 1853, Springer 2000.
(Continued)

*Primary Examiner* — Morshed Mehedi
*Assistant Examiner* — Abiy Getachew
(74) *Attorney, Agent, or Firm* — Lempia Summerfield Katz LLC

(57) ABSTRACT

A device for decrypting data includes a number of devices secured by at least one security device. The secured devices include a receiver for receiving calculation data encrypted using a homomorphic encryption function and a decryptor for decrypting the encrypted calculation data by carrying out the inverse of the homomorphic encryption function on the encrypted calculation data using a private key assigned to the homomorphic encryption function. A method and a computer program product for decrypting data are also provided.

19 Claims, 4 Drawing Sheets

(58) Field of Classification Search
CPC . G06Q 20/40145; G06T 1/005; G06T 1/0057; G06T 2201/0052
USPC .................................................. 380/44, 253
See application file for complete search history.

(56) References Cited

U.S. PATENT DOCUMENTS

| | | |
|---|---|---|
| 2012/0036371 A1 | 2/2012 | Hayek |
| 2012/0039465 A1* | 2/2012 | Gentry et al. .................. 380/44 |
| 2012/0185755 A1* | 7/2012 | Orlik et al. .................. 714/781 |

OTHER PUBLICATIONS

Biehl I. et al; Ensuring the Integrity of Agent-Based Computations by Short Proofs; Mobile Agents 1998; Lecture Notes in Computer Science Bd. 1477; pp. 183-194, Springer-Verlag, Berlin/Heidelberg; ISBN: 978-3-54-064959; DOI: 10.1007/BFb0057658; XP055057973; Jan. 1, 1998.
Craig Gentry, Shai Halevi: Fully Homomorphic Encryption without Squashing Using Depth-3 Arithemtic Circuits, FOCS 2011.
Craig Gentry: A Fully Homomorphic Encryption Scheme, Dissertation, Stanford University, Sep. 2009.
German Office Action for German Application No. 10 2011 087 804.1, mailed Aug. 10, 2012, with English Translation.
Marten van Dijk, Craig Gentry, Shai Halevi, Vinod Vaikuntanathan: Fully Homomorphic Encryption over the Integers, Advances in Cryptography, Eurocrypt 2010, Lecture Notes in Computer Science 6110, p. 24-43, Springer 2010.
Menezes J. et al., "Handbook of applied cryptography", CRC Press, 1997, Chapter 8.
Nigel P. Smart, Frederik Vercauteren: Fully Homomorphic Encryption with Relatively Small Key and Ciphertext Sizes, Public Key Cryptography 2010, Lecture Notes in Computer Science 6056, p. 420-443, Springer 2010.
Ostrovsky et al., "Private Searching on Streaming Data", 2007, URL: http://www.cs.ucla.edu/~rafail/PUBLIC/Ostrovsky-Skeith.pdf.
PCT International Search Report and Written Opinion of the International Searching Authority dated Apr. 5, 2013 for corresponding PCT/EP2012/072598.
Sanjeev Arora, Shmuel Safra: Probabilistic Checking of Proofs: A New Characterization of NP, Journal of the ACM, 45 (1):70-122, 1998.
Chinese office Action for related Chinese Application No. 201280060258.X dated Mar. 24, 2016 with English Translation.

* cited by examiner

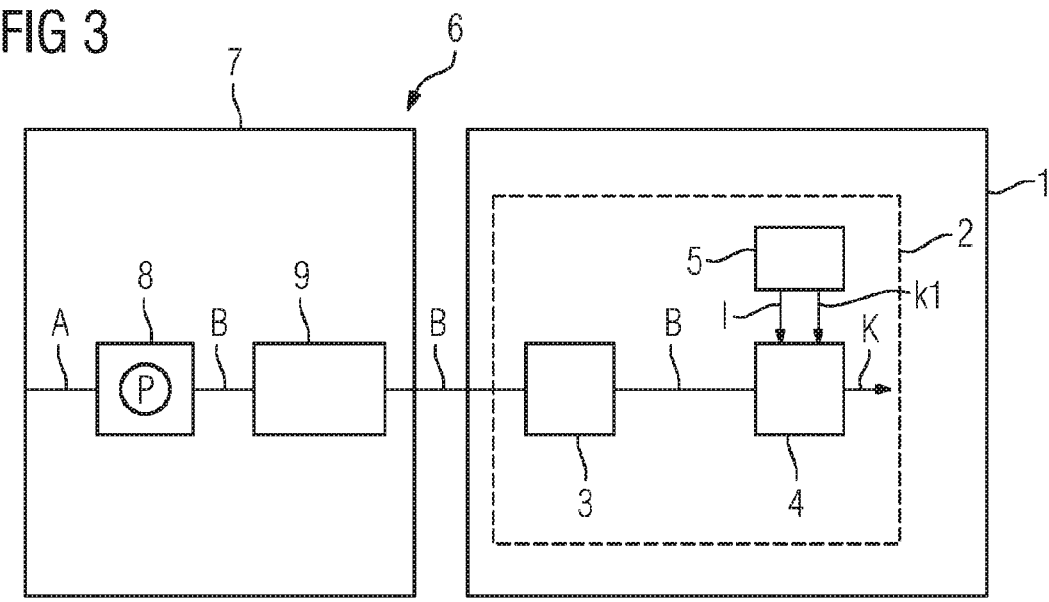
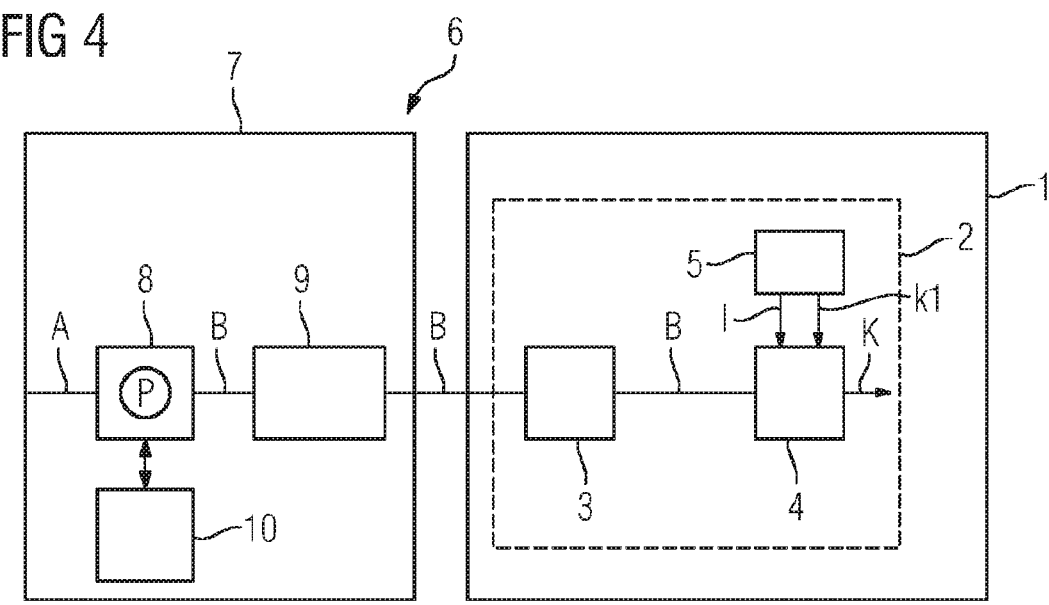

DECRYPTING DATA

This application is the National Stage of International Application No. PCT/EP2012/072598, filed Nov. 14, 2012, which claims the benefit of German Patent Application No. DE 10 2011 087 804.1, filed Dec. 6, 2011. The entire contents of both documents are hereby incorporated herein by reference.

BACKGROUND

The present embodiments relate to the decryption of data using a cryptographically and/or physically secure apparatus.

In theoretical cryptography, the security of a cryptographic method is conventionally assessed using the input and output behavior. In this case, an attacker or a hacker may see only the input and/or the output of the cryptographically processed data and is then to draw conclusions on the cryptographic key used with knowledge of the method used.

For example, the computational steps of the cryptographic method are executed in a protected environment to which the attacker does not have access. In practice, such a secure computational environment may be simulated using a security token (e.g., a chip card or a dongle). The security token has various hardware and software protective measures that make it possible for the security token to be used both as a confidential and tamperproof memory for secret data (e.g., key material) and to directly execute parts of the application to be protected in the target system in the protected environment of the token. However, the security token may be greatly restricted with respect to the memory size of data and program memories and power and performance of the available computational capacity. Therefore, only the core cryptographic functions may be implemented in a security token. The largest part of the application or program then runs on a computer system with no level of protection or a considerably lower level of protection.

There are also approaches that make it possible to physically protect more powerful computer systems. However, the outlay for these measures and the additional costs during technical implementation are so high in relation to the levels of protection that may be achieved and the planned applications that such methods are used only for applications with military security.

If a cryptographic algorithm that requires an item of secret information is to be executed on a system that allows the attacker to follow the progress of the algorithm, further protective mechanisms are used in order to be protected against particular classes of attacks. If, for example, it is possible for the attacker to measure physical properties of the computational environment (e.g., runtime), dynamic current consumption or electromagnetic radiation, during the computation process, measures for warding off side-channel attacks are important.

If the computational environment for the cryptographic method includes a computer system that does not provide any physical protection, the attacker has complete control over the computational steps carried out and the processed data. In this case, the algorithm is to be implemented such that it is not possible for the attacker, even though the attacker may understand the execution of the algorithm down to the last detail, to understand the algorithm or to extract the processed secret. Such an implementation of an algorithm is referred to as obfuscated.

Methods for providing a secure calculation environment extend from pure software solutions to specially produced hardware or combinations of software and hardware. In this case, at least one security device that provides physical and/or cryptographic protection is used to implement the secure calculation environment. Pure software solutions are used if no further protective functions are available through the hardware of the computer system, or this is not desirable for reasons of cost. The program intended to be executed on the computer system may be changed by suitable code transformations (e.g., code obfuscation) such that reverse engineering by an attacker is made more difficult or is ideally prevented. Special techniques (e.g., white box cryptography) may be used in the software to protect secret key material. The level of security that may be achieved is low in comparison with techniques using hardware protective measures, and the transformation of the code may be associated with considerable performance losses and a considerably greater need for program and storage space.

In the solution approaches with hardware support, a security token is used in most applications to provide a secure computer system. Such a security token includes special hardware protective mechanisms (e.g., sensors for temperature, operating voltage, attacks using laser flashes, encrypted buses and memories, noise generators, random wait state generators, shields for protecting against probing using needles, special chip design styles etc.). Security tokens are simple computer systems including RAM, a non-volatile memory (e.g., flash or EEPROM), a CPU and IO interfaces (e.g., UART, SPI, USB, etc.), and provide a comparatively high level of security against attacks. The security tokens may include additional hardware for efficiently calculating cryptographic methods (e.g., DES accelerators, AES accelerators, arbitrary precision arithmetic units). The performance of the security tokens may be very restricted with respect to memory size, CPU speed and data throughput of the interfaces, with the result that only small, security-relevant parts of an application may be executed inside the token.

Alternatively, single-chip controllers specifically produced for security applications are also available on the market and may be used, for example, in embedded applications.

These computer systems may be somewhat more powerful than security tokens but make the design of a product considerably more expensive.

The entire device may be protected by special measures for designing the housing. Such measures extend from simple switches for detecting the opening of a housing, special housings, drill protection films, special printed circuit boards to production techniques such as casting or sealing. The devices may have an active sensor system in order to be able to detect and respond to tampering attempts and use an uninterruptible power supply with a battery for this purpose. A powerful computer system including standard components may be used inside such a device. However, the corresponding development and production outlay for such systems is high, with the result that such protective measures may only occur in military applications. Organizational measures for regularly exchanging the battery are additionally used in order to be able to provide availability of the devices.

Until a few years ago, a homomorphic encryption function was a concept only discussed in theoretical cryptography and intended to make it possible to implement a secure calculation environment for programs on unprotected computer systems solely using computational operations on encrypted data.

A method for implementing homomorphic encryption functions with all properties used to carry out any desired calculations under particular cryptographic complexity assumptions has been described (see Craig Gentry, A Fully Homomorphic Encryption Scheme, Dissertation, Stanford University, September 2009). The techniques described have been developed further, and performance has been improved (see Nigel P. Smart, Frederik Vercauteren, Fully Homomorphic Encryption with Relatively Small Key and Ciphertext Sizes, Public Key Cryptography 2010, Lecture Notes in Computer Science 6056, p. 420-443, Marten van Dijk, Craig Gentry, Shai Halevi, Vinod Vaikuntanathan, Fully Homomorphic Encryption over the Integers, Advances in Cryptography, EUROCRYPT 2010, Lecture Notes in Computer Science 6110, p. 24-43, and Craig Gentry, Shai Halevi, Fully Homomorphic Encryption without Squashing Using Depth-3 Arithmetic Circuits, FOCS 2011).

SUMMARY AND DESCRIPTION

The scope of the present invention is defined solely by the appended claims and is not affected to any degree by the statements within this summary.

The present embodiments may obviate one or more of the drawbacks or limitations in the related art. For example, a secure calculation environment implemented from available standard components in a cost-effective manner with a high degree of security is provided.

In one embodiment, an apparatus (e.g., a security device) for decrypting data includes a number of devices that are secured by at least one security device and have at least one receiver and a decrypting device. The receiver is set up to receive calculation data encrypted by a homomorphic encryption function. The decrypting device is set up to decrypt the encrypted calculation data by carrying out the inverse of the homomorphic encryption function on the encrypted calculation data using a private key assigned to the homomorphic encryption function.

The security device is used to implement a secure calculation environment. In this case, the security device provides, for example, physical and/or cryptographic protection. The security device may be produced as a pure software solution (e.g., stored in a non-transitory computer-readable storage medium), as specially produced hardware (e.g., one or more processors), or as a combination of software and hardware. In this case, the security device protects against side-channel attacks, for example.

The calculation data encrypted by the homomorphic encryption function may be the result of calculations of a program transformed by a homomorphic encryption function.

The practice of using the homomorphic encryption function to calculate the encrypted calculation data makes it possible to carry out the calculation on an unprotected computer system.

The encrypted calculation data are calculated by a device (e.g., an unprotected computer including standard components). In this case, the unprotected computer applies the program transformed by the homomorphic encryption function to input data in order to provide the encrypted calculation data. The encrypted calculation data is then encrypted by the homomorphic encryption function. The properties of the homomorphic encryption function advantageously make it possible to execute the computation-intensive part of the program on the unprotected computer or computer system including standard components. Therefore, this computation-intensive part of the execution of the program may not be executed on the decryption apparatus having the secure calculation environment set up for decryption. The security of the program or the application is provided by the cryptographic properties of the homomorphic encryption function and does not require any special hardware protective measures by the computer system. For example, the performance limitations that are customary for the decryption apparatus (e.g., a security token) and are caused by the memory and program size or performance of the CPU of the decryption apparatus do not exist. The transformed program carries out all calculations in an encrypted manner. The encrypted calculation data are transferred to the decryption apparatus and in the process are received by the receiver of the decryption apparatus. The final decryption is carried out on the protected decryption apparatus because the unprotected device (e.g., the unprotected computer system) may not provide any sufficient measures for protecting the secret key of the homomorphic encryption function used for decryption.

The present solution is very cost-effective since fewer resources (e.g., computation power and storage capacity) are used for the secure calculation environment (e.g., the decryption apparatus) than for the device for applying the transformed program. In this case, the computation-intensive tasks of applying the transformed program are carried out by the non-secure or poorly secure device that is provided with greater resources but with less cost-intensive security measures. In contrast, the decryption apparatus has a higher level of security but uses considerably fewer resources for the remaining step of decryption than the device for applying the transformed program.

Such a homomorphic encryption function makes it possible to add, subtract and multiply values of a suitable mathematical structure that are present in encrypted form, such that the result of the calculations is present in encrypted form. During the calculation, there are no intermediate results or other information relating to the combined values in unencrypted form in a manner accessible to an attacker at any time, and the performance of these computational steps also does not require knowledge of secret key material. In other words, the calculations may be carried out on a non-secure computer system without jeopardizing or disclosing the processed data.

With the aid of the mathematical operations of addition, subtraction and multiplication, polynomial functions of encrypted values may be calculated in a secure and secret manner. The polynomial functions may then be used to describe any desired calculations of computer systems. If the result of the calculation is ultimately present in the form of an encrypted value, only the legitimate recipient who has the private key of the homomorphic encryption function is able to decrypt the calculated values.

In one embodiment, the device secured using the at least one security device includes a storage means. The storage device is set up to store a program for calculating the inverse of the homomorphic encryption function and to provide the decrypting device with the stored program of the inverse of the homomorphic encryption function. The storage device is a flash memory or a RAM memory, for example.

In another embodiment, the storage device is also set up to store the private key assigned to the homomorphic encryption function and to provide the decrypting device with the stored private key.

In another embodiment, the decrypting device is hardwired. For example, the decrypting device is in the form of an integrated circuit (IC) (e.g., application-specific integrated circuit (ASIC)) or a field programmable gate array (FPGA).

In another embodiment, the apparatus is a security token, a USB token, a smartcard, a protected server or a protected computer.

In one embodiment, a system includes a device having an application device for applying the program transformed by the homomorphic encryption function to input data in order to provide the encrypted calculation data, and a transmission device (e.g., a transmitter) for transmitting the encrypted calculation data. The system also includes an apparatus for decrypting the transmitted encrypted calculation data, as explained above.

In one embodiment of the system, the device is an unprotected computer or an unprotected server.

In another embodiment, the transmission device of the device and the receiver of the apparatus are set up to carry out a predetermined interface protocol for transmitting the encrypted calculation data.

The predetermined interface protocol makes it possible to transmit the encrypted calculation data from the device to the decryption apparatus in a targeted and predetermined manner.

In another embodiment, the device is equipped with resources in order to completely execute the transformed program within a predetermined period in which the apparatus may not completely execute the transformed program.

In this case, the resources include, for example, the provided computation power of the CPU and the storage capacity of the memory or memories of the device.

In another embodiment, the device has a protection device that is set up to protect the transformed program from tampering. The protection device may guarantee tampering-free execution of the transformed program.

In another embodiment, the protection device is set up to provide proof of the correct execution of the transformed program by the application device (e.g., using probabilistically checkable proofs (PCP); see Sanjeev Arora, Shmuel Safra, Probabilistic Checking of Proofs: A New Characterization of NP, Journal of the ACM, 45(1): 70-122, 1998, Ingrid Biehl, Bernd Meyer, Susanne Wetzel, Ensuring the Integrity of Agent-Based Computation by Short Proofs, Mobile Agents 1998, Lecture Notes in Computer Science 1477, p. 183-194, William Aiello, Sandeep N. Bhatt, Rafail Ostrovsky, Sivaramakrishnan Rajagopalan, Fast Verification of Any Remote Procedure Call: Short Witness-Indistinguishable One-Round Proofs for NP, Automata, Languages and Programming, International Colloquium ICALP 2000, Lecture Notes in Computer Science 1853, p. 463-474, Springer 2000).

In this embodiment, the scope of protection of the program on the powerful device that carries out the homomorphically encrypted calculations may be extended to the effect that the program is protected from tampering. For this purpose, the program on the powerful, but otherwise unprotected, device (e.g., the unprotected computer system) may be extended, for example, such that proof of the correct performance of the calculation is provided at the same time when applying the program. Probabilistically checkable proofs (PCPs) are used for this purpose, for example. PCPs have the property that PCPs may be checked very efficiently. The proof of the correctly executed calculation on the device may then be checked in turn in the decryption apparatus. The decryption apparatus may decrypt the homomorphically encrypted calculation data only when the proof of the calculation is accepted as valid.

The respective devices (e.g., the receiver, the decrypting device or the protection device) may be implemented using hardware or software. In the case of a hardware implementation, the respective devices may be in the form of an apparatus or part of an apparatus (e.g., a computer, a microprocessor or an IC, an ASIC or a FPGA). In the case of a software implementation, the respective devices may be in the form of a computer program product, a function, a routine, part of a program code or an executable object stored in a memory.

A method for decrypting data using an apparatus secured by at least one security device is also provided. The method includes receiving calculation data encrypted by a homomorphic encryption function, and decrypting the encrypted calculation data by carrying out the inverse of the homomorphic encryption function on the encrypted calculation data using a private key assigned to the homomorphic encryption function.

A computer program product that causes the method for decrypting data using an apparatus secured by at least one security device, as explained above, to be carried out on a program-controlled device is also provided. The program controlled device is, for example, a decryption apparatus such as a security token.

A computer program product such as a computer program device may be provided or delivered, for example, as a storage medium such as a memory card, a USB stick, a CD-ROM, a DVD or else in the form of a downloadable file from a server in a network. This may be effected, for example, in a wireless communication network by transmitting a corresponding file including the computer program product or the computer program device.

BRIEF DESCRIPTION OF THE DRAWINGS

FIG. 3 shows a block diagram of a first exemplary embodiment of a system having a calculation device and a decryption apparatus;

FIG. 4 shows a block diagram of a second exemplary embodiment of a system having a calculation device and a decryption apparatus;

DETAILED DESCRIPTION

In the figures, the same or functionally same elements have been provided with the same reference symbols unless otherwise indicated.

Figure 1:
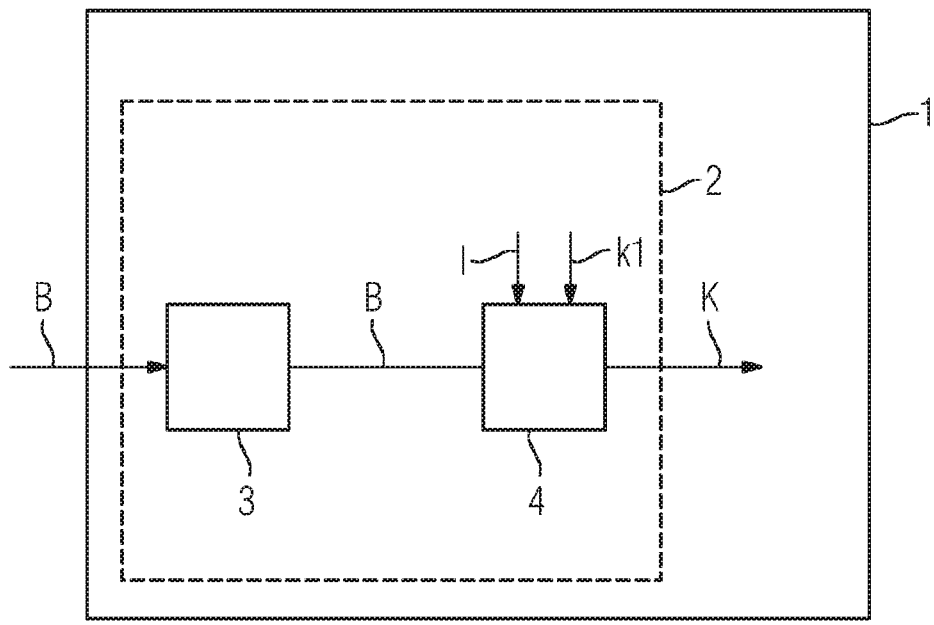
FIG. 1 shows a block diagram of a first exemplary embodiment of a decryption apparatus.

FIG. 1 illustrates a block diagram of a first exemplary embodiment of a cryptographically and/or physically protected decryption apparatus 1.

The decryption apparatus 1 is, for example, a security token, a USB token, a smartcard, a protected server or a protected computer.

Units 3, 4 of the apparatus 1 are protected against tampering, spying and/or hacker attacks by at least one security device 2.

The decryption apparatus 1 has a receiver 3 and a decrypting device 4. The receiver 3 is suitable for receiving encrypted calculation data B that is encrypted using a homomorphic encryption function f.

The calculation data B encrypted using the homomorphic encryption function f may be results of calculations of a program P transformed using the homomorphic encryption function f.

In other words, a program S may be transformed into a transformed program P using the homomorphic encryption function f. The calculation data B calculated by the transformed program P are encrypted (e.g., by the homomorphic encryption function f).

The decrypting device 4 is suitable for decrypting the received encrypted calculation data B by carrying out the inverse I of the homomorphic encryption function f on the encrypted calculation data B using a private key k1 assigned to the homomorphic encryption function f.

A key pair including the private key k1 and a public key k2 is assigned to the homomorphic encryption function f. The public key k2 is used to transform a program S, for example (see FIG. 5). The decrypting device 4 outputs the decrypted calculation data K as plain text on the output side. The decrypted calculation data K may be displayed on a display apparatus (not shown), for example, or may be used for a further program or an application.

Alternatively, the decrypting device 4 may also be hard-wired.

Figure 2:
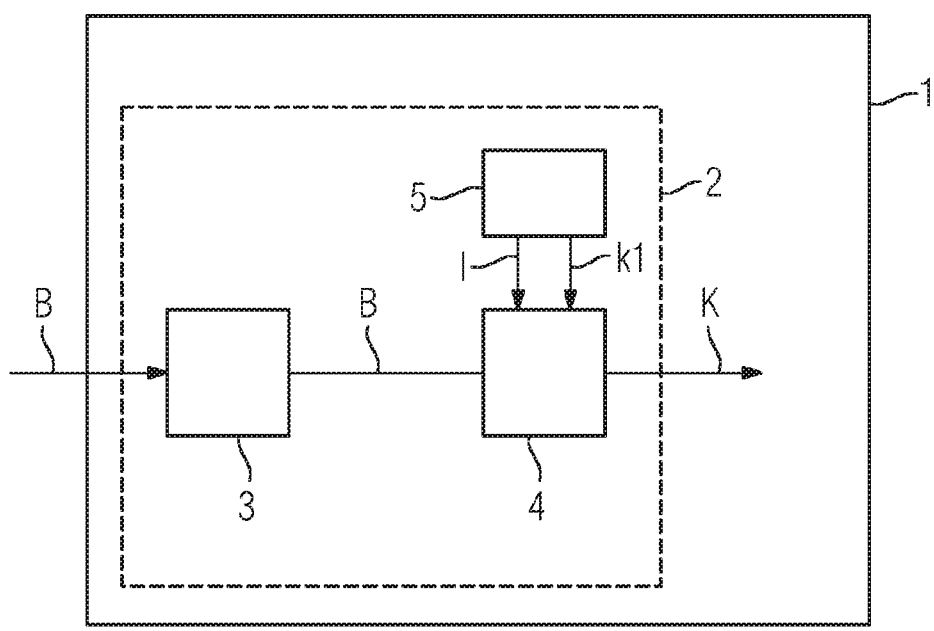
FIG. 2 shows a block diagram of a second exemplary embodiment of a decryption apparatus.

FIG. 2 shows a block diagram of a second exemplary embodiment of a decryption apparatus 1. The decryption apparatus 1 in FIG. 2 is based on the decryption apparatus 1 in FIG. 1 and has all of the features of FIG. 1. In addition, the decryption apparatus 1 in FIG. 2 has a storage device 5 that is set up to store a program for calculating the inverse I of the homomorphic encryption function f and to provide the decrypting device 4 with the program. The storage device 5 also stores the private key k1 assigned to the homomorphic encryption function f and provides the decrypting device 4 with the key.

FIG. 3 shows a block diagram of a first exemplary embodiment of a system 6 having a calculation device 7 and a decryption apparatus 1. For example, the calculation device 7 is an unprotected computer system, where the decryption apparatus 1 is a cryptographically and/or physically protected security token.

The calculation device 7 has an application device 8 that is set up to apply the transformed program P to input data A in order to provide the encrypted calculation data B. The application device 8 provides a transmission device 9 (e.g., a transmitter) of the calculation device 7 with the calculated calculation data B. The transmitter 9 is set up to provide the decryption apparatus 1 with the encrypted calculation data B. The transmitter 9 of the device 7 and the receiver 3 of the apparatus 1 are set up to carry out a predetermined interface protocol for transmitting the encrypted calculation data B.

The decryption apparatus 1 corresponds to the apparatus 1 in FIG. 2. Accordingly, the receiver 8 receives the transmitted encrypted calculation data B and provides the decrypting device 4 with the data.

In contrast to the decryption apparatus 1, the calculation device 7 is suitable for completely executing the transformed program P within a predetermined period. The calculation device 7 has a considerably higher computation power and a considerably higher storage capacity than the decryption apparatus 1. Consequently, the computation power of the calculation device 7 is used in the system 6 to apply the transformed program P, where the decryption apparatus 1 is used for security.

FIG. 4 illustrates a block diagram of a second exemplary embodiment of a system 6 having a calculation device 7 and a decryption apparatus 1. The second exemplary embodiment in FIG. 4 is based on the first exemplary embodiment in FIG. 3 and has all of the features of the first exemplary embodiment in FIG. 3. In addition, the calculation device 7 in FIG. 4 has a protection device 10. The protection device 10 is set up to protect the transformed program P from tampering. In this case, the protection device 10 may provide, for example, proof of the correct execution of the transformed program P by the application device 8. Probabilistically checkable proofs (PCP) may be used in this case.

Figure 5:
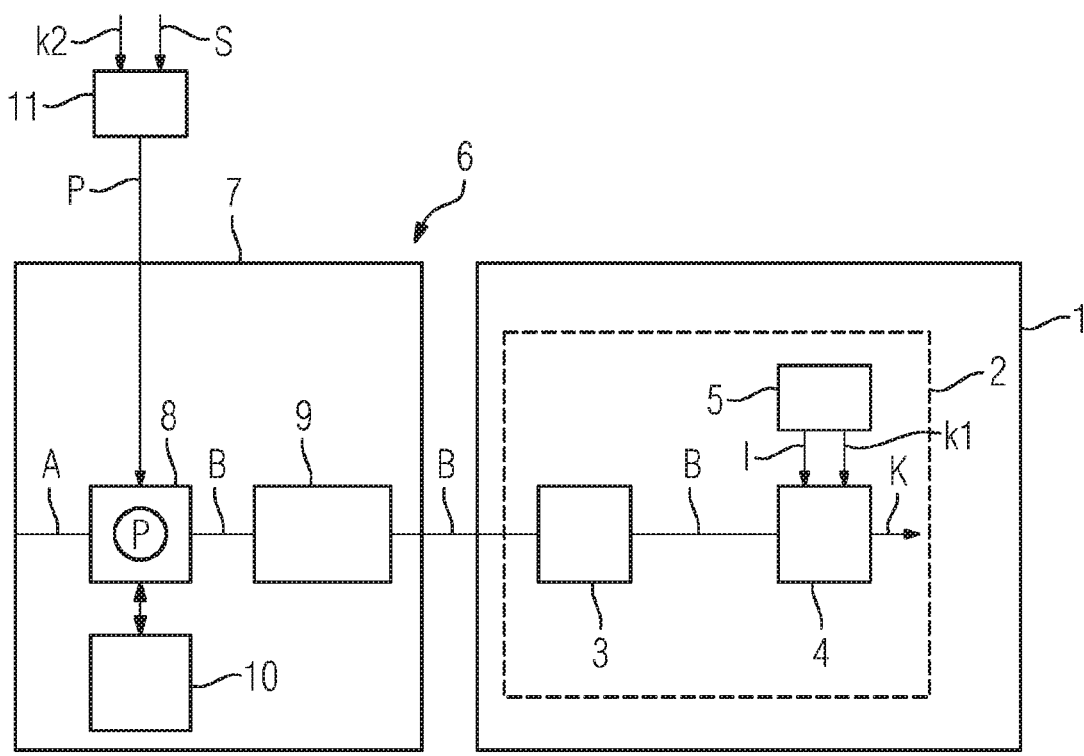
FIG. 5 shows a block diagram of a third exemplary embodiment of a system having a calculation device and a decryption apparatus.

FIG. 5 shows a block diagram of a third exemplary embodiment of a system 6 having a calculation device 7 and a decryption apparatus 1. The third exemplary embodiment in FIG. 5 is based on the second exemplary embodiment in FIG. 4 and has all of the features of the second exemplary embodiment in FIG. 4. In addition, the system 6 in FIG. 5 has a transformation device 11. The transformation device 11 is set up to transform a program S for calculating the calculation data into the transformed program P that is used by the application device 8. For this transformation, the transformation device 11 uses the homomorphic encryption function f using the public key k2.

Figure 6:
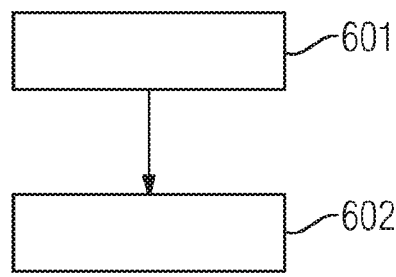
FIG. 6 shows a flowchart of a first exemplary embodiment of a method for decrypting data.

FIG. 6 illustrates a flowchart of a first exemplary embodiment of a method for decrypting data using a secure apparatus 1 that may also be referred to as a decryption apparatus 1. The decryption apparatus 1 is designed according to FIG. 1 or 2, for example.

In act 601, encrypted calculation data B is received by the decryption apparatus 1. The encrypted calculation data B is encrypted by a homomorphic encryption function f.

In act 602, the encrypted calculation data B is decrypted by carrying out the inverse I of the homomorphic encryption function f on the encrypted calculation data B using a private key k1 assigned to the homomorphic encryption function f.

Figure 7:
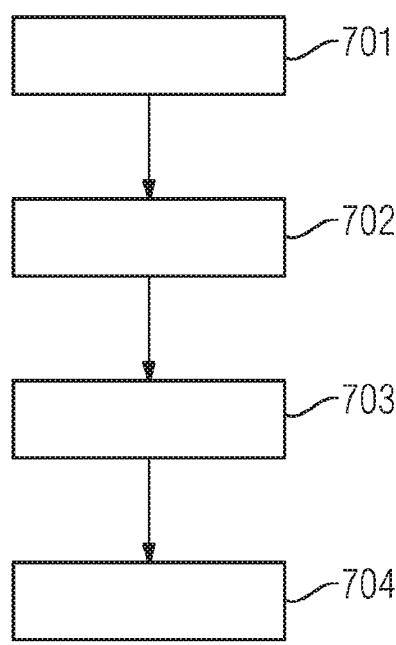
FIG. 7 shows a flowchart of a second exemplary embodiment of a method for decrypting data.

FIG. 7 illustrates a flowchart of a second exemplary embodiment of a method for decrypting data using a secure decryption apparatus 1.

In act 701, a program S for calculating the calculation data is transformed into a transformed program P by a homomorphic encryption function f using a public key k2 assigned to the homomorphic encryption function f.

In act 702, the transformed program P is applied to input data A in order to provide encrypted calculation data B.

In act 703, the encrypted calculation data B is transmitted to the decryption apparatus 1.

In act 704, the encrypted calculation data B is decrypted using the decryption apparatus 1. For this purpose, the inverse I of the homomorphic encryption function f is applied to the encrypted calculation data B using the private key k1 assigned to the homomorphic encryption function f. The decrypted calculation data B is then present in the form of decrypted calculation data K in plain text.

Although the invention was illustrated and described in more detail using the exemplary embodiments, the invention is not restricted by the examples disclosed. Other variations may be derived therefrom by a person skilled in the art without departing from the scope of protection of the invention.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. An apparatus for decrypting data, the apparatus comprising:
a plurality of devices that are secured by at least one security device and comprise a receiver and a decrypting device, the receiver being configured to receive calculation data encrypted by a homomorphic encryption function, and the decrypting device being configured to decrypt the encrypted calculation data by carrying out an inverse of the homomorphic encryption function on the encrypted calculation data using a private key assigned to the homomorphic encryption function,
wherein the plurality of devices secured using the at least one security device comprise a storage device configured to store a program for calculating the inverse of the homomorphic encryption function and to provide the decrypting device with the program.

2. The apparatus of claim 1, wherein the storage device is configured to store the private key assigned to the homomorphic encryption function and to provide the decrypting device with the stored private key.

3. The apparatus of claim 1, wherein the decrypting device is hard-wired.

4. The apparatus of claim 1, wherein the apparatus has a security token, a USB token, a smartcard, a protected server or a protected computer.

5. A system comprising:
a device comprising:
an application device configured for applying a program transformed by a homomorphic encryption function to input data in order to provide encrypted calculation data;
a transmitter configured for transmitting the encrypted calculation data; and
an apparatus for decrypting the transmitted encrypted calculation data, the apparatus comprising:
a plurality of devices that are secured by at least one security device and comprise a receiver and a decrypting device, the receiver being configured to receive the encrypted calculation data encrypted by the homomorphic encryption function, and the decrypting device being configured to decrypt the encrypted calculation data by carrying out an inverse of the homomorphic encryption function on the encrypted calculation data using a private key assigned to the homomorphic encryption function,
wherein the plurality of devices secured using the at least one security device comprise a storage device configured to store a program for calculating the inverse of the homomorphic encryption function and to provide the decrypting device with the program.

6. The system of claim 5, wherein the device is an unprotected computer or an unprotected server.

7. The system of claim 5, wherein the transmitter and the receiver are configured to carry out a predetermined interface protocol for transmitting the encrypted calculation data.

8. The system of claim 5, wherein the device includes resources in order to completely execute the transformed program within a predetermined period in which the apparatus cannot completely execute the transformed program.

9. The system of claim 5, wherein the device includes a protection device configured to protect the transformed program from tampering.

10. The system of claim 9, wherein the protection device is configured to provide proof of a correct execution of the transformed program by the application.

11. The system of claim 5, further comprising a transformation device configured for transforming a program for calculating the encrypted calculation data into the transformed program by the homomorphic encryption function using a public key assigned to the homomorphic encryption function.

12. A method for decrypting data using an apparatus secured by at least one security device, the method comprising:
receiving, by a receiver of the apparatus, calculation data encrypted by a homomorphic encryption function; and
decrypting, by a processor of the apparatus, the encrypted calculation data, the decrypting comprising carrying out an inverse of the homomorphic encryption function on the encrypted calculation data using a private key assigned to the homomorphic encryption function,
wherein the apparatus secured using the at least one security device comprises a storage device configured to store a program for calculating the inverse of the homomorphic encryption function and to provide a decrypting device of the apparatus with the program.

13. The method of claim 12, further comprising transforming a program for calculating the calculation data into a transformed program by the homomorphic encryption function using a public key assigned to the homomorphic encryption function.

14. In a non-transitory computer-readable storage medium having stored therein data representing instructions executable by a programmed processor of an apparatus secured by at least one security device, for decrypting data, the instructions comprising:
receiving, by a receiver of the apparatus, calculation data encrypted by a homomorphic encryption function; and
decrypting the encrypted calculation data, the decrypting comprising carrying out an inverse of the homomorphic encryption function on the encrypted calculation data using a private key assigned to the homomorphic encryption function,
wherein the apparatus secured using the at least one security device comprises a storage device configured to store a program for calculating the inverse of the homomorphic encryption function and to provide a decrypting device of the apparatus with the program.

15. The non-transitory computer-readable storage medium of claim 14, wherein the instructions further comprise transforming a program for calculating the calculation data into a transformed program by the homomorphic encryption function using a public key assigned to the homomorphic encryption function.

16. The system of claim 10, wherein the protection device is configured to provide proof of a correct execution of the transformed program by the application device using probabilistically checkable proofs (PCP).

17. The apparatus of claim 2, wherein the apparatus is a security token, a USB token, a smartcard, a protected server or a protected computer.

18. The apparatus of claim 3, wherein the apparatus is a security token, a USB token, a smartcard, a protected server or a protected computer.

19. The system of claim 6, wherein the transmitter and the receiver are configured to carry out a predetermined interface protocol for transmitting the encrypted calculation data.

* * * * *